United States Patent [19]

Finelli

[11] 3,832,726
[45] Aug. 27, 1974

[54] COLLAPSIBLE CAMERA
[75] Inventor: Patrick L. Finelli, Sudbury, Mass.
[73] Assignee: Polaroid Corporation, Cambridge, Mass.
[22] Filed: Apr. 23, 1973
[21] Appl. No.: 353,901

[52] U.S. Cl. ............................................. 354/187
[51] Int. Cl. ......................................... G03b 17/04
[58] Field of Search ............ 95/39, 40, 11 R, 32, 33

[56] References Cited
UNITED STATES PATENTS
3,677,160  7/1972  Harvey ................................. 95/40
3,709,131  1/1973  Plummer ............................... 95/39
3,722,389  3/1973  Costa et al ............................ 95/39

Primary Examiner—Samuel S. Matthews
Assistant Examiner—Kenneth C. Hutchison
Attorney, Agent, or Firm—Alfred E. Corrigan

[57] ABSTRACT

A camera having a plurality of housing sections coupled to each other for movement between an extended operative position and a collapsed inoperative position. First and second housing sections are adapted to be located in face-to-face relation when the camera is in the collapsed position and a third housing section is provided with a resilient member which is adapted to be compressed during movement of the camera housing sections into the collapsed position to provide a resilient force for urging the second housing section into face-to-face relation with the first housing section.

6 Claims, 6 Drawing Figures

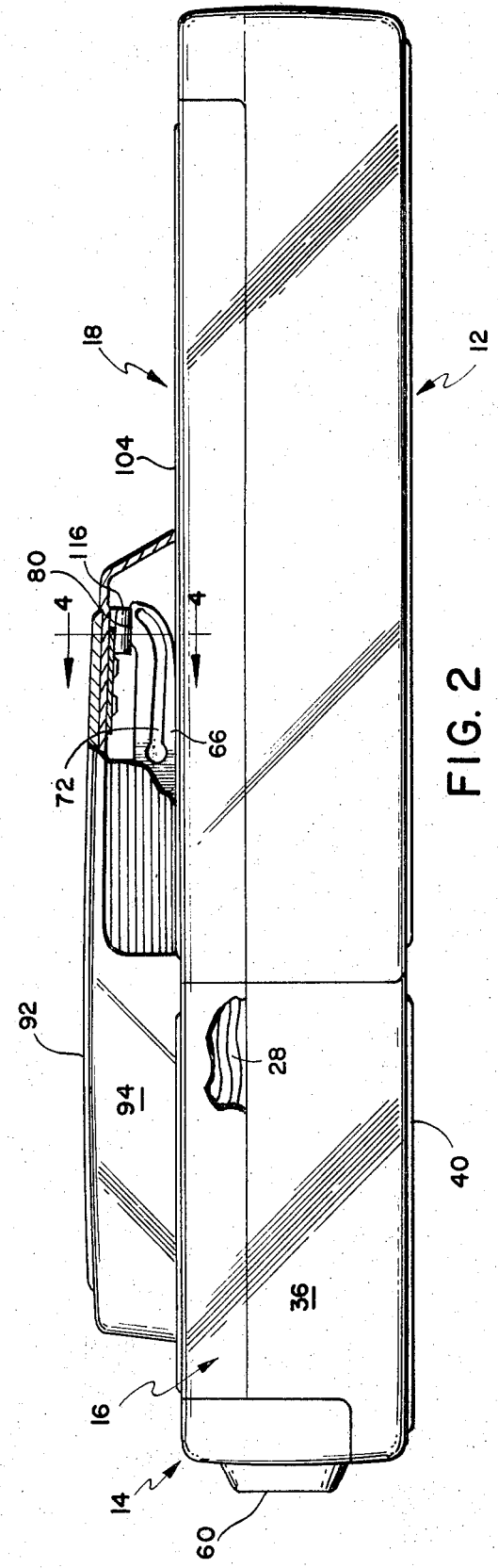
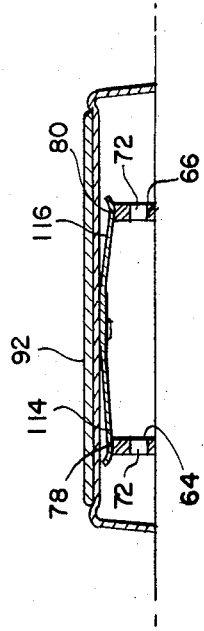
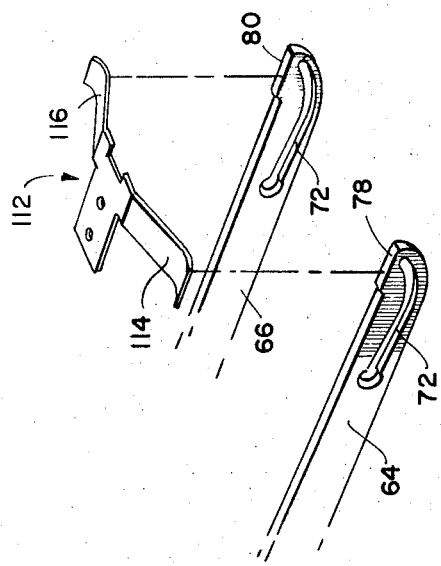

COLLAPSIBLE CAMERA

BACKGROUND OF THE INVENTION

1. Field of the Invention

This invention relates to collapsible cameras.

2. Description of the Prior Art

The present invention is related to improvements in cameras of the collapsible type and, more particularly, to novel means for biasing various housing sections of a collapsible camera into intimate proximity with each other thereby maximizing its compactness when in the collapsed position. Generally, when the housing sections of a camera of the collapsible type are moved into a collapsed position, the adjacent edges of adjacent housing sections do not move fully into engagement with each other. This may be caused by the tolerances of the various housing sections and their pivot points not being kept within very narrow limits, a task which can greatly increase the cost of the camera, or by attempting to maximize the amount of camera components located within the confines of the housing sections when they are in the collapsed position. A classic example of the latter is where a camera bellows is folded during movement of the housing sections into the collapsed position. As the bellows is collapsed, its folds increase the thickness of the bellows until it becomes a resilient body confined by at least two of the housing sections. Final movement of the camera housing sections into the collapsed position may cause a compression of this resilient body thereby providing a force which will tend to move the housing sections out of engagement with each other. A similar force may be provided by components of the camera which are ordinarily spring loaded in the collapsed position for movement to an operative position when the sections of the camera are moved into the extended position. Accordingly, it can be seen that there is a need for a simple and inexpensive means for overcoming the aforementioned forces which are generated during folding of a camera whereby maximum compactness is enhanced.

SUMMARY OF THE INVENTION

The instant invention relates to a camera of the collapsible type and, more particularly, to novel means for maintaining housing sections of the camera in close proximity to each other in their collapsed position in opposition to internal forces tending to increase the spacing between said housing sections. The camera includes a plurality of housing sections coupled to each other and to a bellows to define an exposure chamber when in an extended position and which are adapted to be moved into a collapsed position wherein the camera assumes a thin, substantially flat configuration which lends itself to carriage in a suit pocket or handbag. A first housing section mounts a pair of pressure-applying members, e.g., rollers, which are adapted to be driven to advance an exposed film unit from its exposure position while simultaneously distributing a processing liquid across a layer of the film unit to initiate formation of a visible image therein. The first housing section also includes means for resiliently mounting a light shield for movement into an extended position during movement of the camera housing sections into the extended position. In its extended position, the light shield substantially prevents the passage of light into the exposure chamber via an opening between the first housing section and a second housing section. The second housing section adapted to house a lens and shutter assembly is pivotally coupled to the first housing section for movement into face-to-face relation therewith as the camera moves into its collapsed position. A third housing section having a collapsible viewing device mounted thereon has one of its ends pivotally mounted to the end of the second housing section most remote from the latter's connection to the first housing section, and its opposite end pivotally coupled to one end of a fourth housing section. The fourth housing section has its opposite end, i.e., the end most distant from the end connected to the third housing section, pivotally coupled to the end of the first housing section most remote from the latter's pivotal connection to the second housing section.

The aforementioned viewing device includes at least one erecting link which is adapted to be engaged by the fourth housing section during movement of th housing sections into the collapsed position for partially moving the viewing device into its collapsed inoperative position. The viewing device is adapted to be manually moved into its final collapsed and inoperative position. As the housing sections of the camera are moved into the collapsed position, the bellows and light shield are moved into positions which generate forces tending to oppose the final movement of the sections into the collapsed positions. Forces are generated within the light shield assembly by rotating it in a direction opposite to that in which it is resiliently biased. Forces are generated within the bellows by partially compressing the folds of the collapsed bellows as the camera sections enter the collapsed position. The aforementioned forces are overcome and the compactness of the camera enhanced by providing the viewing device with resilient means, e.g., a spring. During movement of the camera sections and the viewing device into the collapsed position, at least one of the erecting links of the viewing device is trapped between an exterior wall of the fourth housing section and the spring such that the final movement of these parts into their inoperative or collapsed positions is effective to load or compress the spring, thereby providing a force for overcoming the aforementioned forces which were generated during folding of the bellows and/or the light shield. Compression of the spring is effective to pivot the third housing section about its pivotal connection to the fourth housing section in a directon which is effective to move the second housing section into intimate face-to-face relation with the first housing section.

An object of the invention is to provide a camera of the collapsible type with means for insuring intimate juxtaposition of its housing sections in the collapsed position.

Another object of the invention is to negate internally generated forces which tend to move housing sections of a collapsed camera out of intimate juxtaposition with each other.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is a side elevational view, partly in section, of the camera shown in FIG. 1 in its collapsed position;

FIG. 3 is a perspective view of components of the instant invention;

FIG. 4 is a schematic cross-sectional view taken generally along the line 4—4 of FIG. 2;

DETAILED DESCRIPTION OF THE INVENTION

Figure 1:
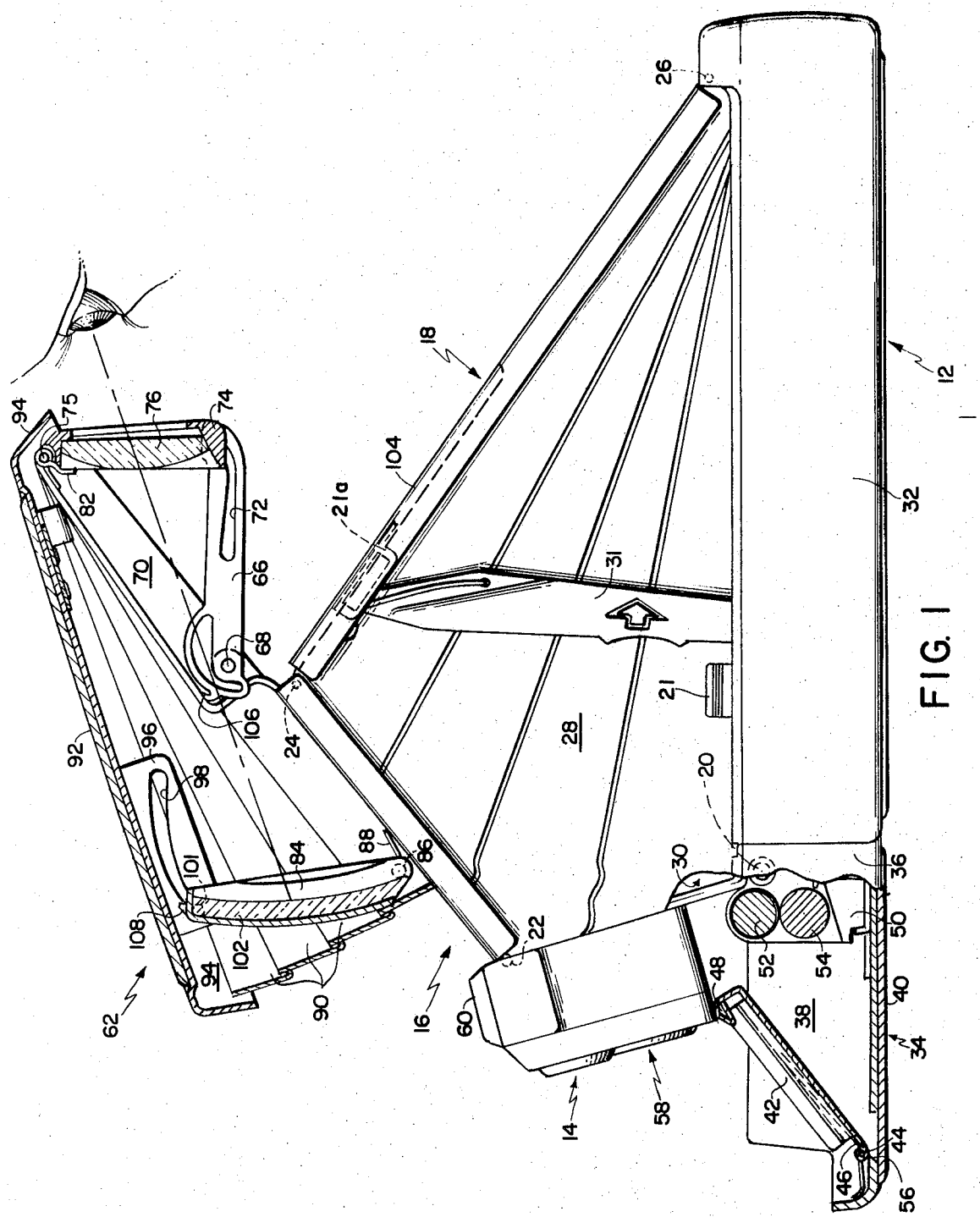
FIG. 1 is a side elevational view of a collapsible camera incorporating the instant invention, with portions cut away to show internal features of the camera.
Figure 5:
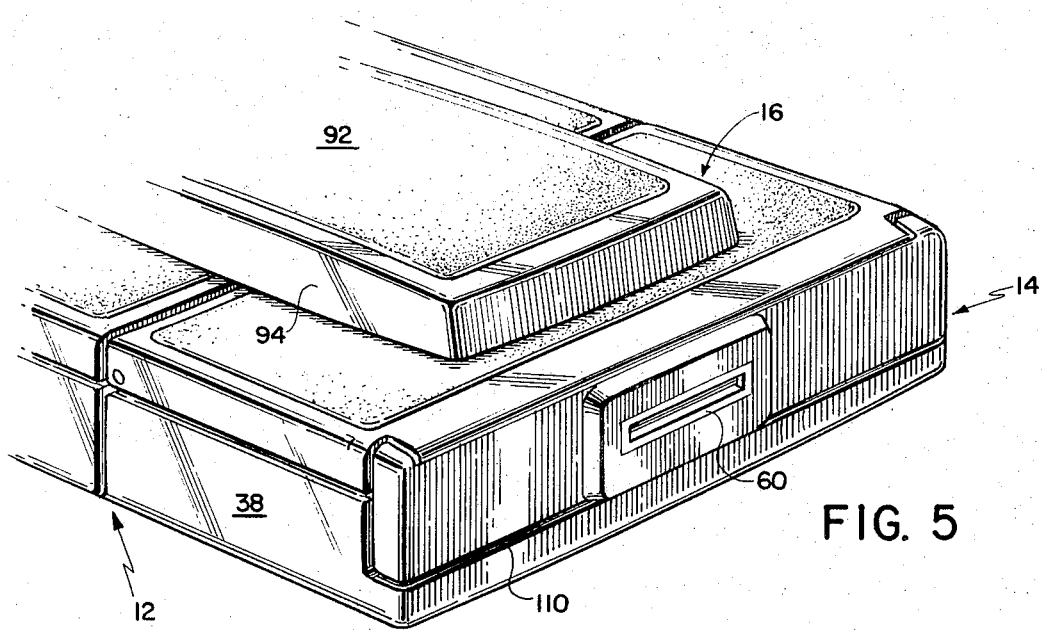
FIG. 5 is a partial perspective view of a camera similar to that of FIG. 1 shown in its collapsed position with a gap between adjacent housing sections.
Figure 6:
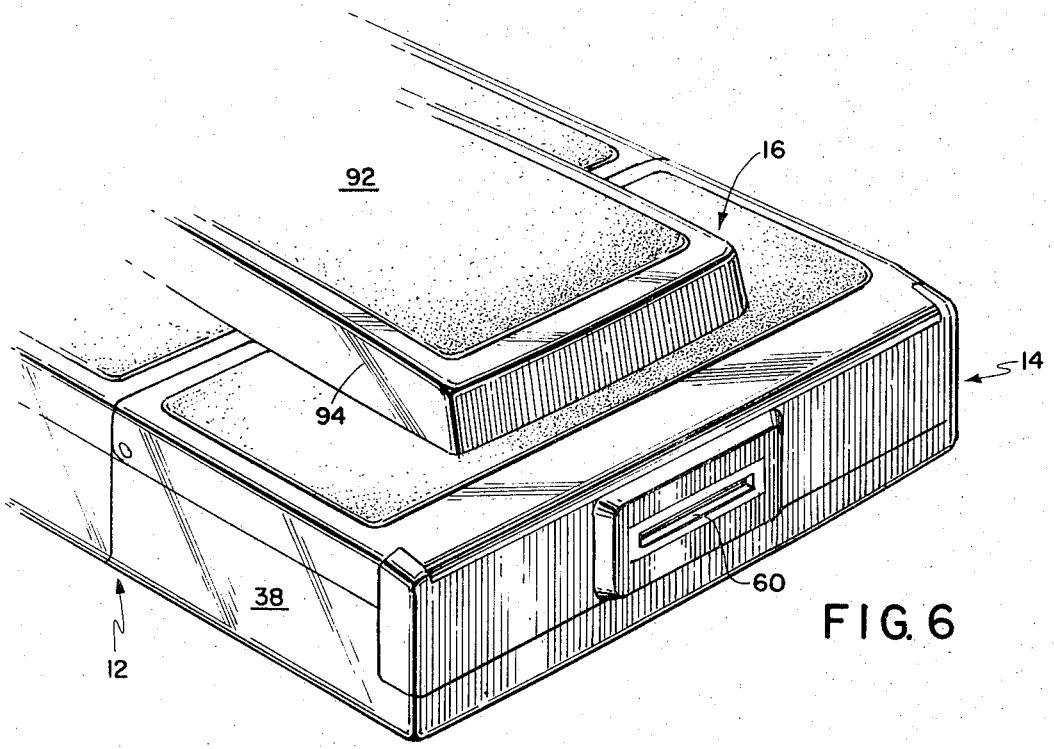
FIG. 6 is a view similar to FIG. 5 showing the intimate face-to-face relation of two housing sections as a result of the instant invention.

Reference is now made to FIG. 1 of the drawings wherein is shown a camera 10 of the collapsible type. Camera 10 includes a plurality of housing sections, i.e., first, second, third and fourth housing sections 12, 14, 16 and 18, respectively, pivotally coupled to each other at 20, 22, 24 and 26 for movement between the extended operative position shown in FIG. 1 and a collapsed inoperative position, as shown in FIGS. 2, 5 and 6. A bellows 28, preferably formed from a flexible material, is coupled to housing sections 12, 14 and 18 to define an exposure chamber 30. The housing sections and bellows are supported in the extended position by a link 31.

First housing section 12 includes a first portion 32 in which a film cassette is adapted to be supported in position for exposure of a film unit contained therein, and a second portion 34, pivotally coupled to the first portion by suitable means (not shown) for permitting loading of a film cassette into the first portion 32. Second portion 34 is generally U-shaped and includes spaced side walls 36 and 38 and a bottom wall 40. An opaque light shield 42 extends between side walls 36 and 38 and is pivotally coupled to bottom wall 40 by a pin 44. Light shield 42 is resiliently biased in a counterclockwise direction (as viewed in FIG. 1) by a spring 46 such that a free end 48 of the light shield contacts second housing section 14 to substantially prevent the passage of light therethrough and into chamber 30. Second portion 34 also provides means such as bracket 50 for mounting a pair of rollers 52 and 54 in position to receive within its bite a film unit as it is advanced from its exposure position within chamber 30. As is well known in the art, rollers 52 and 54 are adapted to spread a processing liquid across a layer of the exposed film unit to initiate formation of a visible image in the film unit as it is advanced toward an exit slot 56.

Second housing section 14 includes means for supporting a lens and shutter assembly 58 and a socket 60 for receiving a source of artificial illumination, e.g., a linear flash array. Second housing section 14 is pivotally coupled to first housing section 12 for movement into a collapsed position wherein the two housing sections are in juxtaposed or face-to-face relation, as shown in FIGS. 2, 5 and 6.

A collapsible viewing device 62 is mounted on third housing section 16 for movement between an extended operative position, as shown in FIG. 1, and a collapsed inoperative position, as shown in FIGS. 2, 5 and 6. Viewing device 62 includes a pair of links 64 and 66 pivotally coupled at 68 to an extension 70 of third housing section 16. Each link 64 and 66 includes a cam slot 72 which is adapted to receive a pin (not shown) on an eyelens mount 74 for guiding an eyelens 76 between its extended and collapsed position. Also, each link 64 and 66 is provided with an upwardly turned end 78 and 80 (see FIG. 3), the function of which will be explained hereinafter. Eyelens mount 74 is suitably resiliently biased about a pivot pin 75 into its operative or extended psotiion by a spring 82. A mirror 84 is mounted forwardly of eyelens 76 for redirecting an image received from within chamber 30 toward eyelens 76. Mirror 84 is pivotally mounted on third housing section 16 by a pin 86 for movement between its extended position shown in FIG. 1 and a collapsed position wherein it lies substantially parallel with and adjacent to housing section 16. Suitable spring means 88 are provided for resiliently urging mirror 84 into its extended operative position. Viewing device 62 also includes a plurality of U-shaped opaque members 90 extending upwardly from housing section 16. Members 90 have their free ends pivotally connected to pivot pin 75 such that members 90 may be moved from a collapsed position in which they are in telescopic relation with each other and the extended position shown in FIG. 1 wherein they shield mirror 84 from ambient light. Finally, the collapsible viewing device 62 includes a generally rectangular cover member 92 having a peripheral depending flange 94 which is adapted to enclose the viewing device as shown in FIGS. 2, 5 and 6. Extending downwardly from cover member 92 is a flange 96 having a cam slot 98 therein. Slot 98 is adapted to receive a pin 100 extending outwardly of mirror mount 102 for guiding the mirror 84 and its mount 102 between the extended and collapsed positions. For a more detailed description of the viewing device, reference is made to U.S. Pat. No. 3,710,697, granted to Fraser et al. on Jan. 16, 1973 and assigned in common herewith.

Camera 10 is adapted to be folded, i.e., its various sections moved into their collapsed positions by applying pressure to link 31 in the direction of the arrow until the link pivots in a counterclockwise manner to a position wherein housing sections 12, 14, 16 and 18 are free to be moved into their collapsed positions. After link 31 has been unlatched, downward pressure is applied preferably to a housing section 18 or alternatively to cover 92. Downward pressure on housing section 18 is effective to pivot it about its pivot 26 to housing section 12 and to transmit pivotal movement to housing section 14 via housing section 16. As housing sections 14 and 18 pivot in a counterclockwise manner into the collapsed position shown in FIGS. 2, 5 and 6 (housing section 16 being simultaneously rotated in a clockwise manner about pivot 22), an exterior surface 104 of housing section 18 moves into engagement with links 64 and 66. Continued movement of the housing sections results in links 64 and 66 being rotated in a counterclockwise manner thereby moving eyelens 76 into its collapsed position as the housing sections 12, 14, 16 and 18 enter their collapsed position. After the housing sections and eyelens 76 enter their collapsed positions, downward pressure is manually applied to the left portion (as viewed in FIG. 1) of cover 92 to pivot cover 92 about pin 76 thereby moving mirror 84 and U-shaped members 90 into their collapsed position. The viewing device is adapted to be releasably maintained in the collapsed position by a resilient latch 106 integral with link 66 which is adapted to engage a protrusion 108 in mirror mount 102, as is more fully described in the aforementioned Fraser et al.patent. The housing sections 12 and 18 are releasably maintained in their collapsed position by a latch (21, 21a). Alternatively, the camera may be collapsed by moving link 31 to an unlatch position and manually depressing cover 92. The force applied to the viewing device 62 via cover 92 is transmitted to the housing sections to move the latter as previously described.

It should be noted that during movement of the housing sections into their collapsed position, light shield 42 is rotated by housing section 14 in a clockwise manner against the bias of spring 46 into a generally horizontal position (as viewed in FIG. 1) between housing section 14 and U-shaped portion 34 of housing section 12; also, flexible bellows 28 is progressively folded (see FIG. 2) as the interior of housing sections 16 and 18 moves into superposed relation with the first housing section 12. The movement of these members, i.e., the light shield and the bellows, into their collapsed positions generates forces which tend to move housing sections 14 out of its juxtaposed or face-to-face relation with second portion 34 of first housing section 12. For example, the compression of the folded bellows as housing sections 12 and 18 enter their collapsed positions may be sufficient to generate a force therein which will take up any play in the latch therebetween, thereby slightly moving housing section 18 in a clockwise manner about pivot 26. This movement of housing section 18 results in housing section 14 being pivoted through a correspondingly small arc about pin 20 thereby generating a gap 110 (see FIG. 5) between housing sections 12 and 14. The bias of spring 46 also provides a force which is transmitted to housing section 14 via the free end 48 of light shield 42 to pivot housing section out of its intimate juxtaposed relation with housing section 12. Obviously, gap 110 not only precludes the intimate face-to-face relationship originally designed into the camera, but it also detracts from the compactness thereof and provides a means whereby dirt and other foreign matter may enter the camera. Further, gap 110 may be mistakenly used by a user as a means by which the camera may be moved into its extended operative configuration, thereby possibly damaging the camera.

The instant invention provides a novel, simple and inexpensive means for offsetting the aforementioned problems related to collapsible cameras. Specifically, a resilient member, e.g., a generally T-shaped spring 112, is suitably attached to an interior surface of cap 92 such that its cantilever arms 114 and 116 are mounted in position to be engaged and compressed by the upturned ends 78 and 80, respectively, of links 64 and 66 as the viewing device and camera sections enter their collapsed and inoperative positions. Compressing the cantilever arms 114 and 116 provides a force which tends to rotate cover 92 and housing section 16 in a counterclockwise manner about pivot 24. This latter movement is transmitted to housing section 14 to rotate the latter about pivot 20 and into intimate face-to-face juxtaposition with first housing section 12 thereby obviating or greatly reducing the adverse effects of gap 110, as seen in FIG. 6.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A collapsible camera comprising:
   a plurality of housing sections including first, second, third and fourth housing sections coupled to each other for movement between an extended position and a collapsed position wherein said first and second housing sections are adapted to be located in face-to-face relation;
   means for releasably securing said housing sections in said collapsed position;
   first resilient means operative when said housing sections are in said collapsed position to provide a force for biasing said first and second housing sections out of said face-to-face relation; and
   second resilient means mounted on said third housing section in position to be compressed during movement of said fourth housing section into said collapsed position for resiliently urging said second housing section into said face-to-face relation with said first housing section with a greater force than said first resilient means biases said first and second housing sections out of said face-to-face relation.

2. A collapsible camera as defined in claim 1 further including first pivot means for coupling said second housing section to said third housing section and second pivot means for coupling said fourth housing section to said third housing section intermediate said means mounted on said third housing section and said first pivot means, whereby compression of said means mounted on said third housing section during movement of said fourth housing section into said collapsed position is effective to pivot said third housing section about said second pivot means to urge said second housing section into said face-to-face relation with said first housing section.

3. A collapsible camera as defined in claim 1 wherein said second resilient means include spring -means.

4. A collapsible camera as defined in claim 3 further including viewing means mounted on said third housing section for movement between operative and inoperative positions and said spring means are mounted in position to be compressed during movement of said plurality of housing sections and said viewing means into said collapsed and inoperative positions, thereby providing a resilient force for urging said first and second housing sections into said face-to-face relation.

5. A collapsible camera as defined in claim 1 wherein said first resilient means includes a bellows connected to at least one of said first and second sections and at least another of said plurality of sections to define an exposure chamber therebetween.

6. A collapsible camera as defined in claim 1 wherein said first resilient means includes means for preventing the passage of light between said first and second sections when said plurality of sections are in said extended position.

* * * * *